United States Patent
Herkersdorf et al.

(10) Patent No.: US 6,556,593 B1
(45) Date of Patent: *Apr. 29, 2003

(54) DIGITAL CROSS CONNECT AND ADD/DROP MULTIPLEXING DEVICE FOR SDH OR SONET SIGNALS

(75) Inventors: Andreas Herkersdorf, Adliswil (CH); Wolfram Lemppenau, Bocholt (DE); Harmen R. van As, Vienna (AU)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,054

(22) PCT Filed: Dec. 11, 1996

(86) PCT No.: PCT/IB96/01418

§ 371 (c)(1),
(2), (4) Date: Jul. 21, 1998

(87) PCT Pub. No.: WO98/26531

PCT Pub. Date: Jun. 18, 1998

(51) Int. Cl.[7] ................................................ H04J 3/04
(52) U.S. Cl. ........................ 370/532; 370/535; 370/536; 370/907
(58) Field of Search .................... 370/532, 536, 370/537, 539, 535, 541, 542, 416, 442, 490, 358, 545, 907

(56) References Cited

U.S. PATENT DOCUMENTS

| | | | |
|---|---|---|---|
| 4,422,171 A | 12/1983 | Wortley et al. | 371/32 |
| 4,454,601 A | 6/1984 | Helms et al. | 371/34 |
| 4,498,186 A | 2/1985 | Hwang et al. | 375/7 |
| 4,719,624 A | * 1/1988 | Bellisio | 370/513 |
| 4,967,405 A | * 10/1990 | Upp et al. | 359/135 |
| 5,189,673 A | * 2/1993 | Burton et al. | 370/490 |
| 5,265,095 A | * 11/1993 | Fiedler et al. | 370/476 |
| 5,291,485 A | * 3/1994 | Afify et al. | 370/476 |
| 5,297,144 A | 3/1994 | Gilbert et al. | 370/95.2 |

(List continued on next page.)

FOREIGN PATENT DOCUMENTS

| | | | |
|---|---|---|---|
| EP | 570220 A2 | 5/1993 | H04L/1/18 |
| EP | 9633563 | 10/1996 | H04J/3/16 |
| EP | 818905 A2 | 6/1997 | H04L/29/02 |
| GB | 2301752 | 12/1996 | |

(List continued on next page.)

Primary Examiner—Hassan Kizou
Assistant Examiner—Saba Tsegaye
(74) Attorney, Agent, or Firm—Douglas W. Cameron; Anne Vachon Dougherty

(57) ABSTRACT

In a communication network for transferring signals, e.g. according to the SONET or SDH standards, interconnecting node devices are provided consisting of parallel processing modules (9-T, 9-R). A plurality of processing modules with first and second interfaces rearrange/insert/extract tributary signals and configurable multiplexing/de-multiplexing components enable each processing module to access any portion of an arbitrarily preselected tributary signal. In a SONET/SDH system, signals between SONET/SDH frames are rearranged on incoming (20) and outgoing (26) main lines=Digital Cross-Connect, or tributary signals are transferred between frames and local lines (16-i-T, 16-i-R)=Add/Drop Function. The system provides configurable multiplexing/de-multiplexing components (22-i, 24-i, 28-i, 30-i) which allow the processing modules to have access to any tributary signals in said frames, thus enabling digital cross-connect and add/drop operations without completely demultiplexing or disassembling frames. In a preferred embodiment, the configurable multiplexing/demultiplexing component includes a pipeline arrangement (22-i, 24-i) connected to all processing modules (9-T, 9-R).

19 Claims, 7 Drawing Sheets

U.S. PATENT DOCUMENTS

| | | | | |
|---|---|---|---|---|
| 5,301,187 A | * | 4/1994 | Reum | 370/276 |
| 5,343,464 A | * | 8/1994 | Iino et al. | 370/227 |
| 5,355,362 A | * | 10/1994 | Gorshe et al. | 370/222 |
| 5,528,605 A | | 6/1996 | Ywoskus et al. | 371/33 |
| 5,530,693 A | | 6/1996 | Averbuch et al. | 370/60 |
| 5,564,021 A | * | 10/1996 | Qiu et al. | 370/460 |
| 5,588,009 A | | 12/1996 | McKay et al. | 371/33 |
| 5,678,178 A | * | 10/1997 | Tahkokorpi | 370/375 |
| 5,745,685 A | | 4/1998 | Kirchner et al. | 395/200.14 |
| 5,796,723 A | * | 8/1998 | Bencheck et al. | 370/252 |
| 5,923,653 A | * | 7/1999 | Denton | 370/375 |
| 5,940,456 A | * | 8/1999 | Chen et al. | 370/516 |
| 6,011,802 A | * | 1/2000 | Norman | 370/446 |
| 6,055,226 A | * | 4/2000 | Verpooten | 370/222 |

FOREIGN PATENT DOCUMENTS

| | | | |
|---|---|---|---|
| JP | 63207231 A | 8/1988 | |
| JP | -53061 A | 2/1993 | |
| JP | 6284141 | 10/1994 | H04L/12/42 |
| JP | 7123067 A | 5/1995 | |
| JP | 7123067 | 5/1995 | H04J/3/08 |
| JP | 7131434 A | 5/1995 | |
| JP | 7131434 | 5/1995 | H04J/3/00 |
| JP | 7283803 | 10/1995 | H04J/3/14 |
| JP | 88008949 | 1/1996 | H04L/12/437 |
| WO | WO96/33563 | 4/1995 | |
| WO | 9631077 | 10/1996 | H04Q/7/38 |

* cited by examiner

DIGITAL CROSS CONNECT AND ADD/DROP MULTIPLEXING DEVICE FOR SDH OR SONET SIGNALS

The present invention concerns a multiplexing device for providing a digital cross connect and add/drop functionality to a SONET and/or SDH compliant signal intercon- nection device. The invention more particularly relates to a modular, non-blocking, expandable, digital interconnection system capable of cross-connecting lower-rate signals (tributaries), where these signals are components of higher rate signals, or may terminate on low speed lines (local ports). It even more specifically concerns a multi- plexing device for a SONET/SDH interconnection circuit employing like modules arranged in parallel, with the number of modules depending on the transmission speed of the SONET/SDH links served.

BACKGROUND OF THE INVENTION

The American National Standards Institute has recently established a new basic standard for high-speed, multiplexed digital data transmission. This is the "synchronous optical network" standard, henceforth referred to as SONET. The SONET standard specifies optical interfaces, data rates, operation procedures and frame structures for multiplexed digital transmission via fiber optic networks.

The International Telecommunications Union (ITU) has adopted the interface principles of SONET and recommended a new global transmission standard for high-speed digital data transmission. This standard is the "synchronous digital hierarchy" (SDH).

For an account of the SDH standard on the "General Aspects of Digital Transmission Systems", reference is made to the ITU standards documents G.707 (Synchronous Digital Hierarchy Bit Rates), G.708 (Network Node Interface for the Synchronous Digital Hierarchy), G.709 (Synchronous Multiplexing Structure), G.782 (Types and General Characteristics of Synchronous Digital Hierarchy (SDH) Equipment), and G.783 (Characteristics of Synchronous Digital Hierarchy (SDH) Equipment Functional Blocks), all issued March 1993.

The SDH standard is designed to enable manufacturers to develop telecommunications equipment which:
  a) will be interchangeable in all telecommunication networks built around the world to its standard; and which
  b) is backwards compatible, i.e. can be used with data which is in the older telecommunications formats used in North America, Europe and Japan.

This is achieved by a hierarchy of so-called "Containers" (C) and "Virtual Containers" (VC), see FIG. 1. The containers, e.g. C-4, C-3, C-12, etc., are information struc- tures designed to accommodate data traffic with specific transmission rates. The C-4 container carries traffic with a base rate of up to 139 264 kbit/s, C-3 carries either up to 44 736 or 34 368 kbit/s, etc. The containers are turned into virtual containers by adding "Path Overhead" information (POH) to it. By procedures defined as multiplexing, mapping, or aligning, data structures are generated which are constitutive to the SDH. These data structures are named "Administrative Unit Groups" (AUG) and "Synchronous Transport Module" (STM). The label of an STM is defined by the number of AUGs it carries: a STM-4 contains for example four AUGs. An AUG contains either one "Administration Unit" (AU) of type 4 or three AU-3. Referring to the simplest case, in turn one AU-4 contains one C-4 signal and one AU-3 carries one C-3 signal.

The SDH/SONET data frames, i.e., the STM-N signals, are 125 msec long. The amount of data transmitted in each frame depends on the hierarchy level N of the signal. The higher hierarchical levels are transmitted at higher data rates than the basic STM-1 level of approximately 155 Mbit/s. (The exact transmission rate is defined as 155.52 Mbit/s. However here and in the following transmission rates are often denoted by their approximate values. This in particular due to the fact that the exact data transmission rates are distorted by overhead data traffic and idle cell stuffing.) The integer N indicates how many times faster the data is transmitted than in the STM-1 level. For example STM-4 denotes a data transmission rate of 622 Mbit/s, whereby each data frame contains four times as many bytes as does a frame of STM-1. Currently, the highest defined level is STM-64 which has a data rate of 9.95 Gb/s. Clearly, each part of the STM-N signal is broadcast in the same time as the corresponding part of an STM-1 signal, but contains N times as many bytes.

The STM-1 signal, as shown in FIG. 2, contains an information rectangle of 9 rows with 270 bytes/row corresponding to a SONET/SDH data rate of 155.52 Mbit/s. The first 9 bytes/row represent the "Section Overhead", henceforth SOH. The remaining 261 bytes/row are reserved for the VCs, which in FIG. 1 is a VC-4. The first column of a VC-4 container consists of the "Path Overhead" (POH). The rest is occupied by the payload (a C-4 signal). Several VCs can be concatenated to provide a single transmission channel with a corresponding bandwidth. For example, four VC-4 in a STM-4 signal can be concatenated to form a single data channel with approximately 600 Mbit/s capacity: in this case the four VC are referred to in the standard terminology as VC-4-4c and the signal as STM-4c.

This flexibility of the SDH standard is partly due to the pointer concept. In SDH, the frames are synchronized, but the VCs within them are not locked to the frames. So the individual containers of the SDH signals do not have to be frame aligned or synchronized among each other. A "pointer" is provided in the Section Overhead which indicates the position of the above introduced POH, i.e. the start of a virtual container in the SDH frame. The POH can thus be flexibly positioned at any position in the frame. The multiplexing of information into higher order SDH frames becomes simpler than in the old data standards, and an expensive synchronization buffer is not required in SDH. Similarly, lower order signals can be extracted out of and inserted into the higher order SDH signals without the need to demultiplex the entire signal hierarchy. The pointers are stored in the fourth row of the Section Overhead.

The Section Overhead is further subdivided into:
  I. The "Regenerator Section Overhead" or RSOH. This contains bytes of information which are used by repeater stations along the route traversed by the SONET/SDH Signal. The Regenerator Section Overhead occupies rows 1–3 of the Section Overhead.
  II. The "Multiplexer Section Overhead" or MSOH. This contains bytes of information used by the multiplexers along the SONET/SDH signal's route. The Multiplexer Section Overhead occupies rows 5–9 of the Section Overhead. These sections are assembled and dissembled at different stages during the transmission process. FIG. 2 also shows an exploded view of the MSOH.

In the SONET system, a base signal of 51.84 Mbit/s is used. It is called the Synchronous Transport Signal level 1, henceforth STS-1. This has an information rectangle of 9 rows with 90 bytes/row. The first three bytes/row are the section overhead and the remaining 87 bytes/row are the "Synchronous Payload Envelope", henceforth SPE. Three of these SPEs fit exactly into one Virtual Container-4. Thus signals in the STS-1 signal format can be mapped into an STM-1 frame. Furthermore, frame-aligned STS-1 or STM-1 signals can be multiplexed into higher order STM-N frames.

In general, any lower data rate signal which is combined with other such signals into new data frames of higher rate is referred to as a "tributary" signal. For example in the previous paragraph, the three STS-1 signals which are combined into one STM-1 signal are tributary signals.

Digital Cross-Connect (DCC) functionality provides the possibility of rearranging the temporal (in case of a serial high-rate signal) or the spatial (in case of a demultiplexed high-rate signal) order of the low-rate signals or tributaries within the high-rate signal.

Add/Drop functionality allows to extract and/or replace one or more tributary signals from the high-rate signal. It is also known as Drop/Insert functionality.

A modular, expandable, non-blocking system for cross-connecting high speed digital signals of the SONET is described for example in the U.S. Pat. Nos. 4,967,405 and 5,040,170. The known system includes a SONET bus interface, a virtual tributary cross-connect module which cross-connects virtual tributary payloads in space, time, and phase to generate new SONET formatted signals.

Another approach to DCC for SDH signals is described in European patent application EP-A 0 552 694, albeit on a very high level of abstraction.

Common to both known methods is that the incoming high-rate data signal is demultiplexed down to the desired signal hierarchy, processed (i.e. descrambled, stripped of overhead information, etc.), and after processing received by a (non-blocking) switching network which redirects the incoming signals to arbitrary output lines. Those output signals undergo essential the reverse processing to be multiplexed into the new outgoing high-rate signal. In other words, the mesh or switching network used to rearrange the tributaries is placed in between the disassembling (receive process) and the assembling (transmit process).

OBJECTS OF THE INVENTION

It is an object of this invention to provide a structure for a SONET/SDH interconnection system which allows efficient handling of tributary signals transferred in higher-speed signals by blocks of multiple processing modules combined on a chip. It is a further object to provide such SONET/SDH signal handling structure which permits cross-connect and add/drop functionality in a flexible manner in such multi-module arrangements. It is a further object to enable such cross-connect and add/drop functions without completely demultiplexing or disassembling frames.

SUMMARY OF THE INVENTION

The objects of the invention are achieved by a system as set forth by the appended claims. The new cross-connect system in its basic variant may be characterized as an essentially parallel arrangement of a plurality of like data processing modules which are capable of processing a part of the high-speed signal, e.g. one tributary or the base signal of a hierarchically ordered signal format (such as the STM-1 signal for SDH) in connection with a configurable multiplexer/demultiplexer (MUX/DEMUX). The MUX/DEMUX can be programmed such as to direct a preselected part of the incoming high speed signal to each of the modules, and vice versa.

Designing a controllable MUX/DEMUX system is in principle a not too difficult task for a skilled person. However, such MUX/DEMUX systems have not been applied to data communication based on signals with a complex and interrelated structure as for example the SONET/SDH signals. These signals do not appear as an "amorphous" string of bits or bytes, but are organized as frames which include other formatted data signals as payloads, and which have check or control bytes covering the whole frame or at least the complete payload of it. It is hence immediately obvious that the seemingly trivial object of designing a suitable MUX/DEMUX under these circumstances becomes a very complex task, which lead the known solutions to resort to a scheme in which multiplexing is performed in a fixed, unchangeable manner with the cross-connect following at a stage where the high-speed signal has been already disassembled into its lower hierarchy signals or tributaries (see above).

The MUX/DEMUX must therefore be seen in connection with the data processing modules, each of which can operate virtually independently from the others, depending only on the configuration data provided externally. Such data modules for SONET/SDH traffic are described in the international application PCT/EP95/01426 (IBM Docket SZ-9-94-017), filed on Apr. 15, 1995 and assigned to the assignee hereof.

In one embodiment of the invention, the MUX/DEMUX comprises at least two different stages with each stage representing the next lower level of the signal hierarchy (being for example characterized by the speed of the data transmission). Though it is in principle possible to configure a single stage MUX/DEMUX system which reduces the transmission speed in a single stage down the "basic" speed of the data processing module, this is not desirable as the costs and availability of high speed components do not scale linearly. With the disclosed multi-stage design, most of the equipment operates in the low speed environment.

In a preferred embodiment, the MUX/DEMUX system comprises a cascaded pipeline providing each of the modules or each of the MUX/DEMUXs of the subsequent stage with the preselected data.

These and other novel features considered characteristic of the invention are set forth in the appended claims. The invention itself however, as well as a preferred mode of use, and further objects and advantages thereof, will best be understood by reference to the following detailed description of illustrative embodiments when read in conjunction with the accompanying drawings.

DESCRIPTION OF THE DRAWINGS

The invention is described in detail below with reference to the following drawings.

DETAILED DESCRIPTION

Before describing the configurable multiplexing/demultiplexing section, the data processing modules used in the present example are briefly described.

Figure 1:
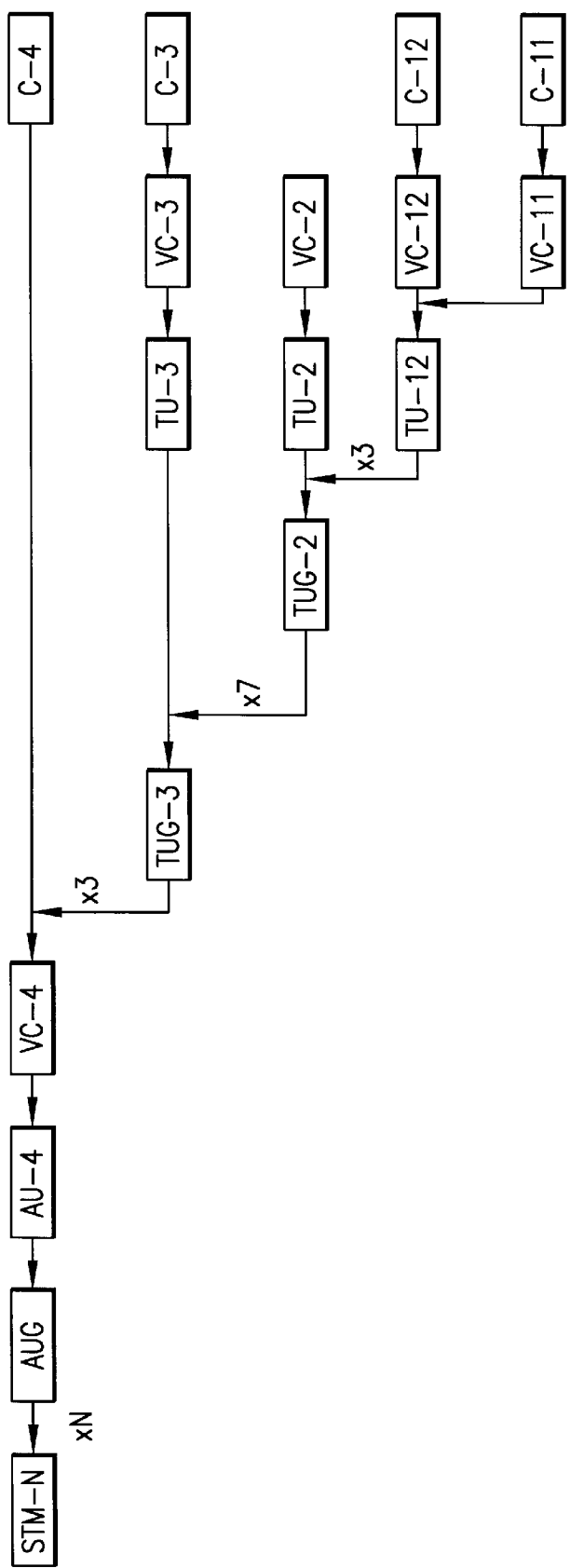
FIG. 1 shows an overview over the SDH signal hierarchy up to the STM-N signal.
Figure 2:
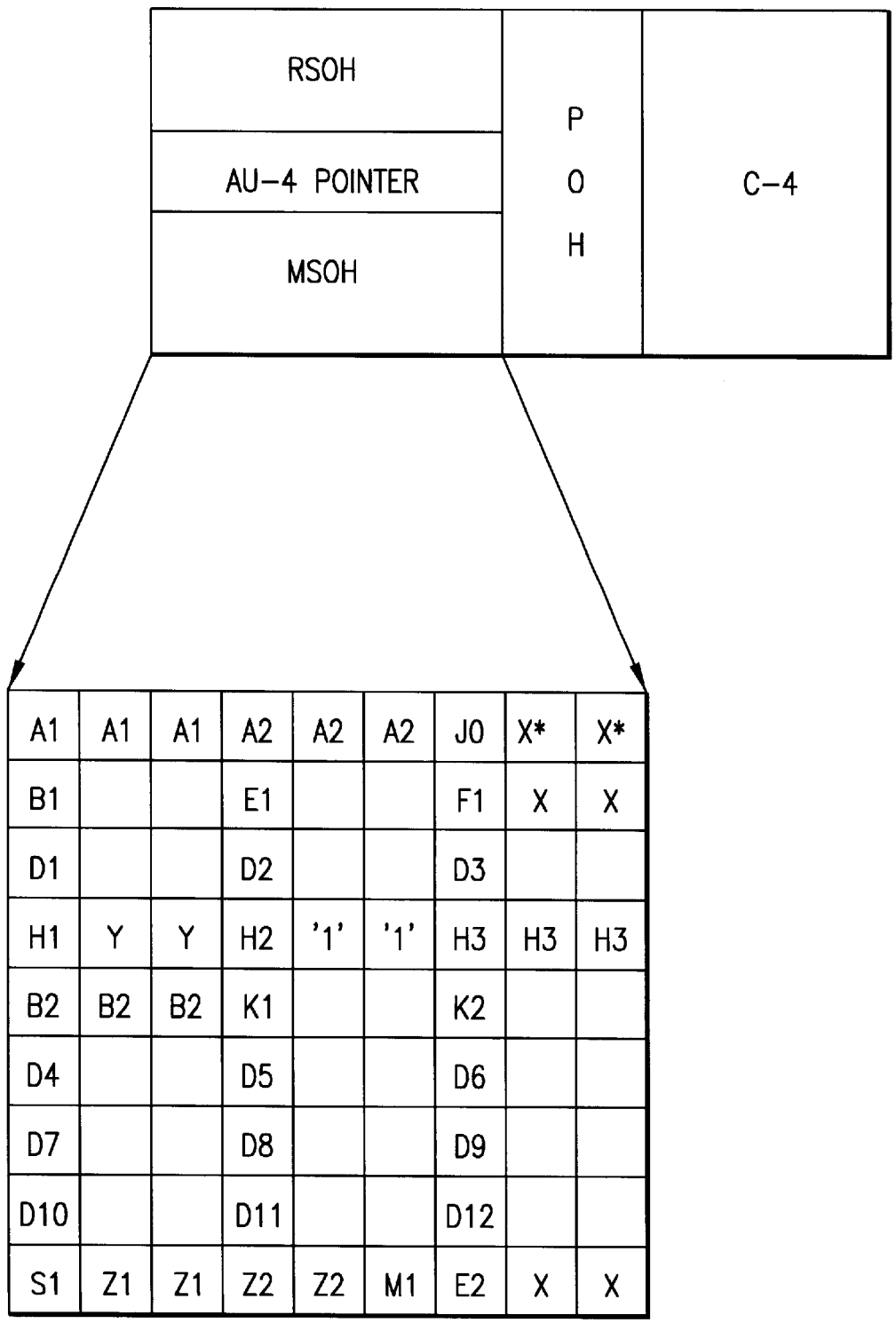
FIG. 2 shows an STM-1 signal with a VC-4 container according to standard provisions.
Figures 3A, 3B:
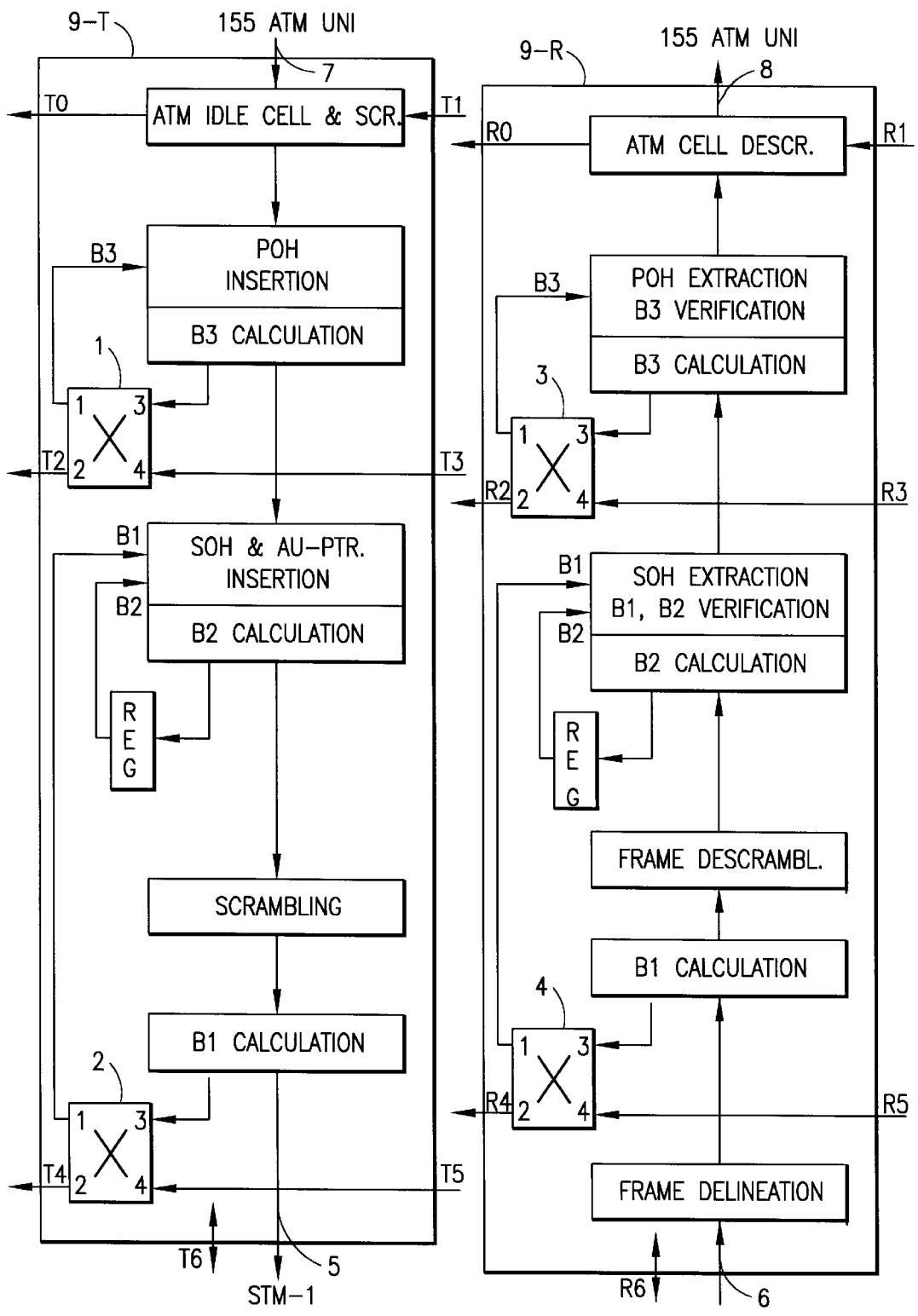
FIGS. 3A, 3B show a transmit (Tx) and receive (Rx) version, respectively, of a base module for SDH/SONET data traffic.

The modules shown in FIGS. 3A and 3B have their basic subfunctions indicated by the various functional blocks on the figure. The "frame delineation" function is required for the Rx (Receive) module only. Other subfunction blocks of the Tx (Transmit) and Rx modules mirror each other, respectively. Further details of the subfunctions performed by the blocks in FIGS. 3A/3B in accordance with the SONET/SDH standard can be found in the ITU standard recommendations (G series). These recommendations are known to anyone actively engaged in the relevant technical field and publicly available. Of particular interest is G.707 along with G.782 (already mentioned above). The functions described in these standards and the basic subfunctions performed by the functional blocks in FIGS. 3A/3B are common to all SONET/SDH processor systems. A detailed description of those features is therefore omitted, except for those features which are deemed to be helpful in explaining the (horizontal) information exchange between single modules in an arrangement.

Interfaces T0/R0 and T1/R1 are provided for ATM signal handling and are of no further interest here. Interfaces T2 (R2) and T3 (R3) are used to forward the module's individually collected and calculated B3 terms from one module to an adjacent module. These interfaces are connected to a switching logic 1 (3), which in the stand-alone mode transmits the output of the B3 calculation section to the POH insertion section (in the Tx module) or to the POH extraction/B3 verification section. In case that several modules are interconnected to an arrangement, the switching logic is a) at the "first" module switched to pass via interface T2 (R2) the output of the B3 calculation to the next module within the arrangement;

b) at an intermediate module switched to perform an XOR operation, with one operand being the output of the internal B3 calculation section and the second operand being the input received via the interface T3 (R3), and passing on the result of this XOR operation via the interface T2 (R2); and c) at the last module of an arrangement switched to perform an identical XOR operation, however, transmitting the result to the POH insertion section or to the POH extraction/B3 verification section, respectively.

Likewise, interfaces T4 (R4) and T5 (R5) are used to forward individually collected and calculated B1-terms from one module to an adjacent module. These interfaces are connected to a switching logic 2 (4).

For the SDH/SONET compliant frame synchronized scrambling section a configurable pseudo random number (PN) sequence generator is provided. It is an important feature of the scrambling sections to be able to generate independently from each other subsets of one PN sequence, e.g. the scrambling sequence as defined in the SDH/SONET standard. Hence, it is possible to configure the frame scrambling section of the module such that in the stand-alone mode the full PN sequence is generated and else, i.e., in an arrangement of several modules, the appropriate subset of the PN sequence is generated. In the STM-4 case specifically, wherein four modules are combined, hence, the frame scrambling section of each module generates every fourth byte of the PN sequence. As a result, a completely scrambled SDH signal frame can be obtained when performing a byte-interleaved multiplexing of the outputs of all four modules. It is important to note that this result is achieved without exchanging register contents between single modules of an arrangement. Hence, no interfaces are provided at this section to other modules.

The appropriate switching means of the intra-module functions to support the necessary interfaces are seen as an additional feature of the modules. The registers of the modules are thus able to accept inputs from other Rx or Tx modules than itself. With these extensions, the base module can be configured as desired.

Another feature consists of a synchronization port T6, R6 to exchange system clock and frame synchronization signals between the modules. The synchronization port allows to choose between several operation modes: if Tx modules and hence a SONET/SDH line is available, a clock extraction circuitry provides the bit clock, the byte clock and the frame sync signal. These signal are then distributed to all mounted Rx modules and their components. The clock extraction circuitry is placed between the optical-to-electrical signal conversion and the receiver. The various clock signals, in particular the important frame sync signal, can be either distributed in parallel, i.e. simultaneously to each module, or funneled through one module of an arrangement, which in turn transmits the signal via the synchronization port to the other modules in either a parallel (point-to-multipoint) or a cascaded (point-to-point transmission between adjacent modules) manner.

The combination of all these additional features permit the modules to function either alone or as part of an assembly of similar modules. The module itself remains standards compliant, it has however been given the capability of "team-working" together with other, like modules.

The module introduced in the preceding paragraphs is generic, i.e. it can be used to design any SONET/SDH processor at any standardized SONET/SDH signal level. It is an important advantage that the clock speed (system clock) remains the same for all levels, i.e. 19.44 MHz even for STM-64 signals.

The signal output 5 of the Tx modules 9-T and the signal input 6 of the Rx modules 9-R, by which the SONET/SDH signals (e.g. STM-1) are transferred out of/into these modules, are also designated as "exterior (module) interfaces" in the following. The signal input 7 of the Tx module and the signal output 8 of the Rx module, by which tributary signals (e.g. 155 ATM UN) are transferred into/out of these modules and which can be connected to local ports, are designated as "interior (module) interfaces" in the following.

Basic to the present invention, however, is the configurable multiplexer/demultiplexer, examples of which are described in the following.

Figure 4:
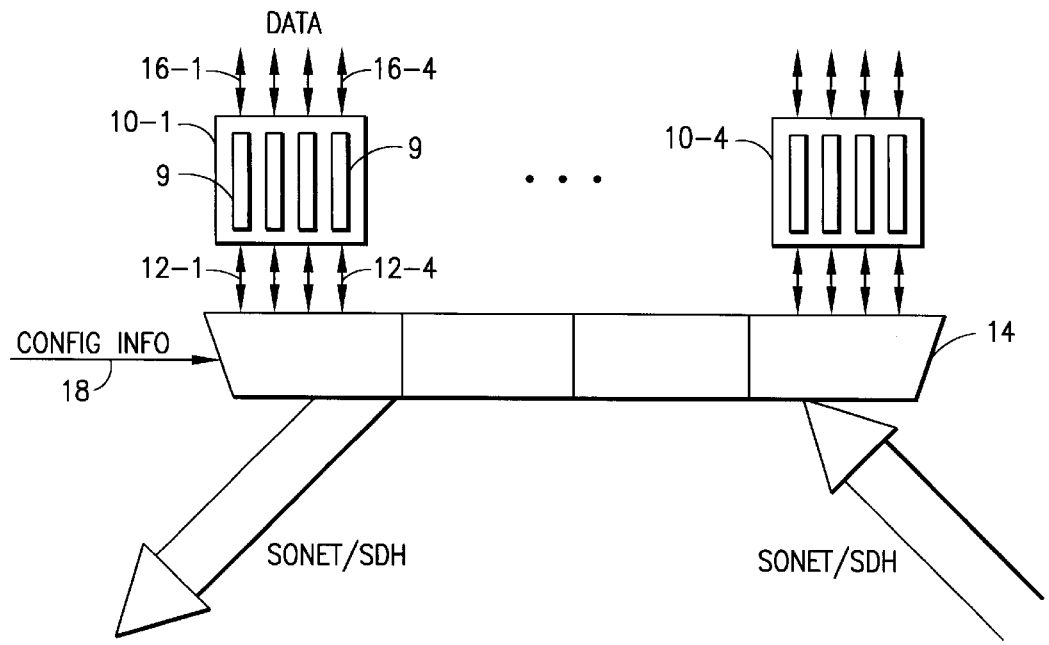
FIG. 4 shows the principle of the cooperation of the configurable random-access demultiplexer with multi-module chips.

In these examples, four of the above described generic modules are cast together into one chip die, denoted as STM-4 chip. Four of these STM-4 chips, operating in parallel, process an STM-16 signal. The principle arrangement, including the random access (or configurable) multiplexer/demultiplexer is shown in FIG. 4. Each of the four STM-4 chips (10-1 ... 10-4) is connected with its four exterior interfaces 12-1 ... 12-4 to the MUX/DEMUX unit 14. Each of these exterior interfaces is coordinated with one (or a Tx/Rx pair) of the basic modules 9 on the respective chip. The SONET/SDH signals transmitted on network lines are transferred out of and into the mux/demux unit. The four interior interfaces 16-1 ... 164 of each STM-4 chip carry data (signals) extracted from, or to be inserted into the SONET/SDH frames. Depending on the interconnections of the interior interfaces either digital cross-connection or local add/drop functions are provided (as will be shown later, cf. FIGS. 8/9). Operation of the multiplexer/demulti-plexer unit 14 can be controlled by configuration information provided on input 18.

An important feature of the MUX/DEMUX unit 14 is its configurability, or its ability to provide random access transfers between the STM-16 frames and the individual modules of each chip. The mutiplexer and demultiplexer could be a n:1 (1:n) crossbar switch which is either hardwired in a configurable unit or which is controlled by a table look-up mechanism, to achieve the required random access functionality.

However, another and preferred solution for the multiplexer and demultiplexer is a pipeline arrangement by which the signals of each STM-16 frame sequentially pass all the exterior chip interfaces so that the tributary signals can be randomly (but according to a predetermined selection) transferred to or from the individual exterior interfaces 12-i.

Figure 5:
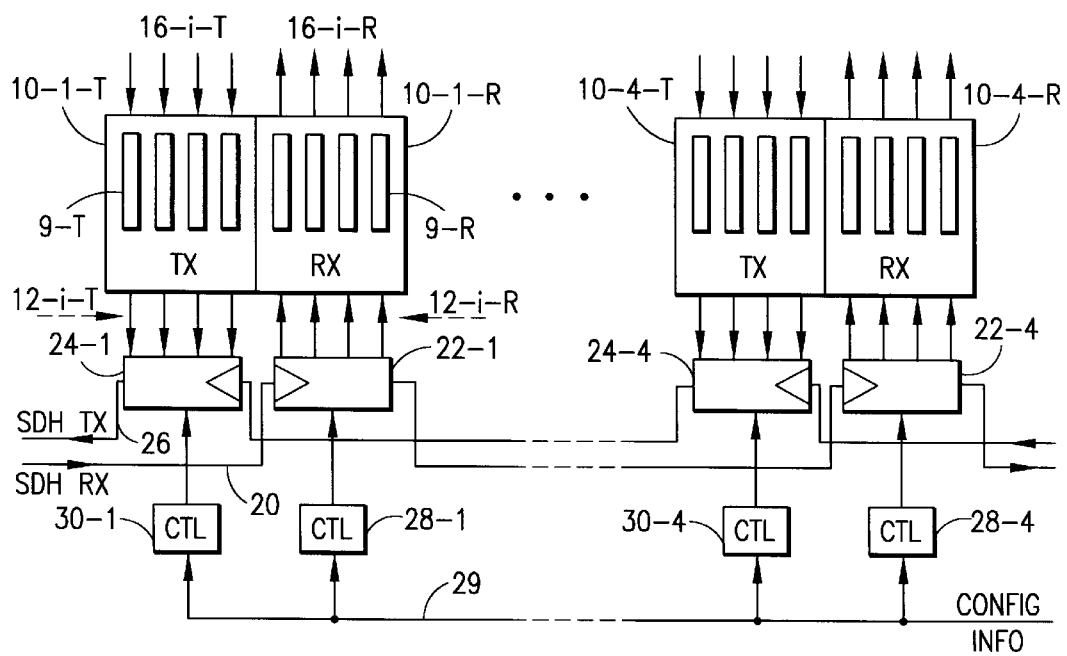
FIG. 5 is a block diagram of the pipeline solution for the configurable multiplexer/demultiplexer with transmit and receive sections of multi-module chips.

The principle arrangement of such a pipeline multiplexer and demultiplexer in connection with a group of STM-4 chips is shown in FIG. 5. It should be noted that each chip has a transmit and receive section, i.e. on each chip eight basic modules are actually provided: four transmit modules 9-T as shown in FIG. 3A, and four receive modules 9-R as shown in FIG. 3B. For the receive portion and for the transmit portion of each STM-4 chip, a pipeline block, i.e. a registering and multiplexing/demultiplexing circuitry is provided, arranged as follows: The SDH RX (receive) signals available on line 20 are passed into the pipeline block 22-1 of the first chip, then into the pipeline block of the other chips and finally into the pipeline block 22-4 of the fourth chip. Thus, these signals sequentially pass all exterior receive interfaces 12-i-R of all four chips, as these interfaces are connected to the pipeline blocks.

Similarly, four transmit pipeline blocks 24-1 ... 24-4 are connected to the exterior transmit interfaces 12-i-T of the chips and are interconnected in series so that transmit signals from the chips can be inserted into the passing data (signal) stream in random (but preselected) sequence and finally are available on SDH TX (transmit) line 26.

To achieve random access functionality, i.e. the configurability of the multiplexer/de-multiplexer arrangement, control means (28-1 ... 28-4 and 30-1 ... 30-4) are provided with the pipeline blocks, which receive configuration information from a management unit (e.g. via a microprocessor) over input 29 so that the configuration can be changed when required.

Figure 6:
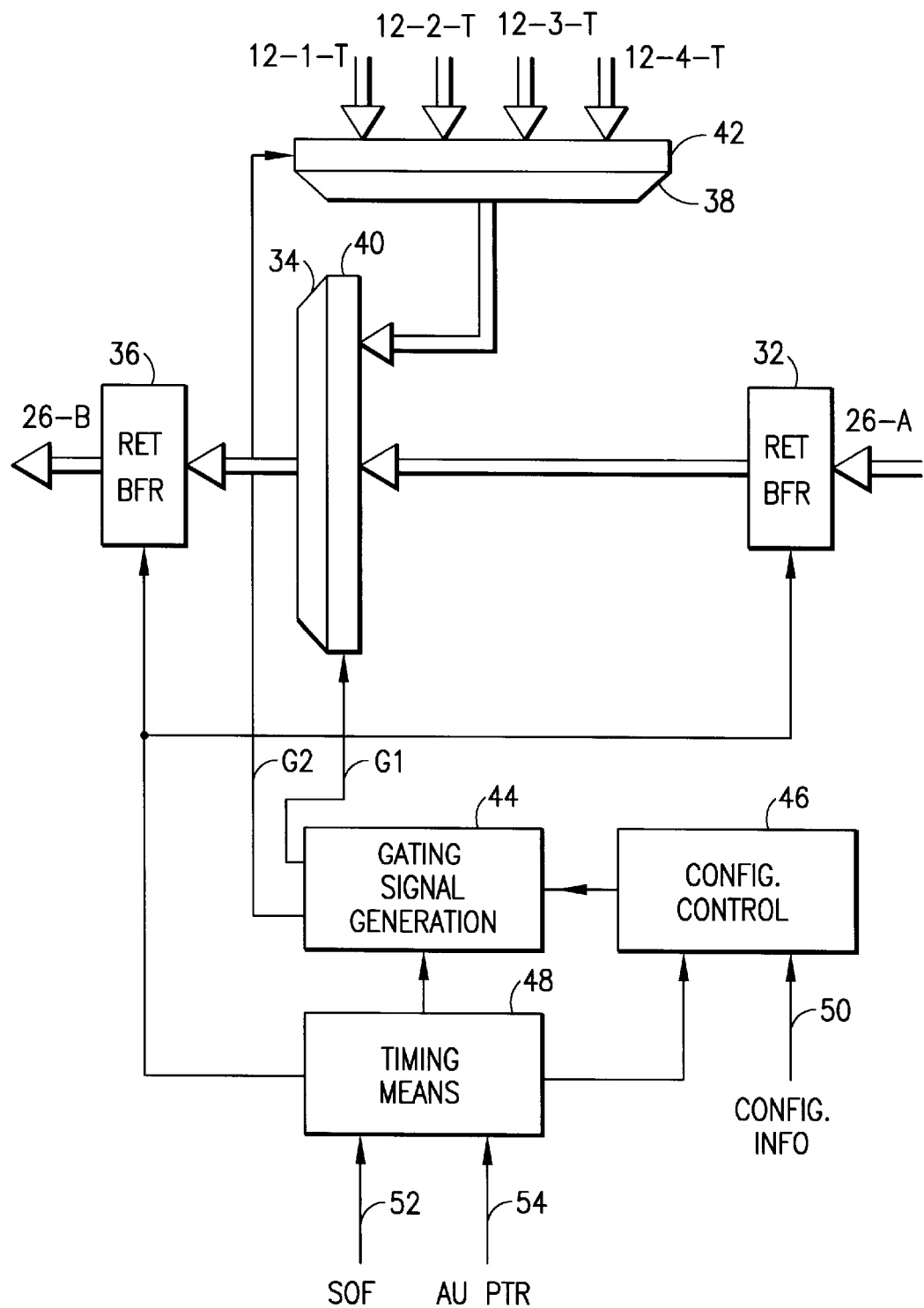
FIG. 6 shows details of the configurable random-access multiplexer for the transmit section of one multi-module chip.

Some more details of the pipeline registering and multiplexing arrangement of the transmit section of the first chip (10-1-T) are depicted in FIG. 6. Signals arriving from the preceding chip on lines 26-A pass through an input retiming buffer 32 (1 byte at a time), a multiplexing circuit 34, and an output retiming buffer 36 to be forwarded on lines 26-B to the following chip. Signals from the four basic transmit modules of the chip on exterior interfaces 12-i-T can be passed through multiplexer circuit 38 into multiplexer circuit 34, for further transmission on lines 26-B.

Each multiplexer (34, 38) has associated gating circuitry (40, 42) which can be controlled by signals (G1, G2) from gating signal generation means 44 which receive input signals from configuration control means 46 and timing means 48. These gating signals may have different speeds, e.g. with a ratio of 1:4. Configuration control means 46 contain a table associating data sources (either local signals or tributary signals of incoming frames) with tributary signals in outgoing frames. Those tables are loaded with configuration information from systems management over input 50. This allows the random but preselected distribution (or rearrangement) of tributary signals in frames. Timing means 48 receive through input 52 the start-of-frame indication SOF and on inputs 54 the AU pointers of the frame header information, so that they can issue the necessary timing signal for each tributary signal, to gating signal generating means 44. Thereby, tributary signals can be arbitrarily associated to local ports.

Analogous pipelined multiplexing and demultiplexing arrangements are provided for all four of the STM-4 chips, as generally indicated in FIG. 5.

Figure 7:
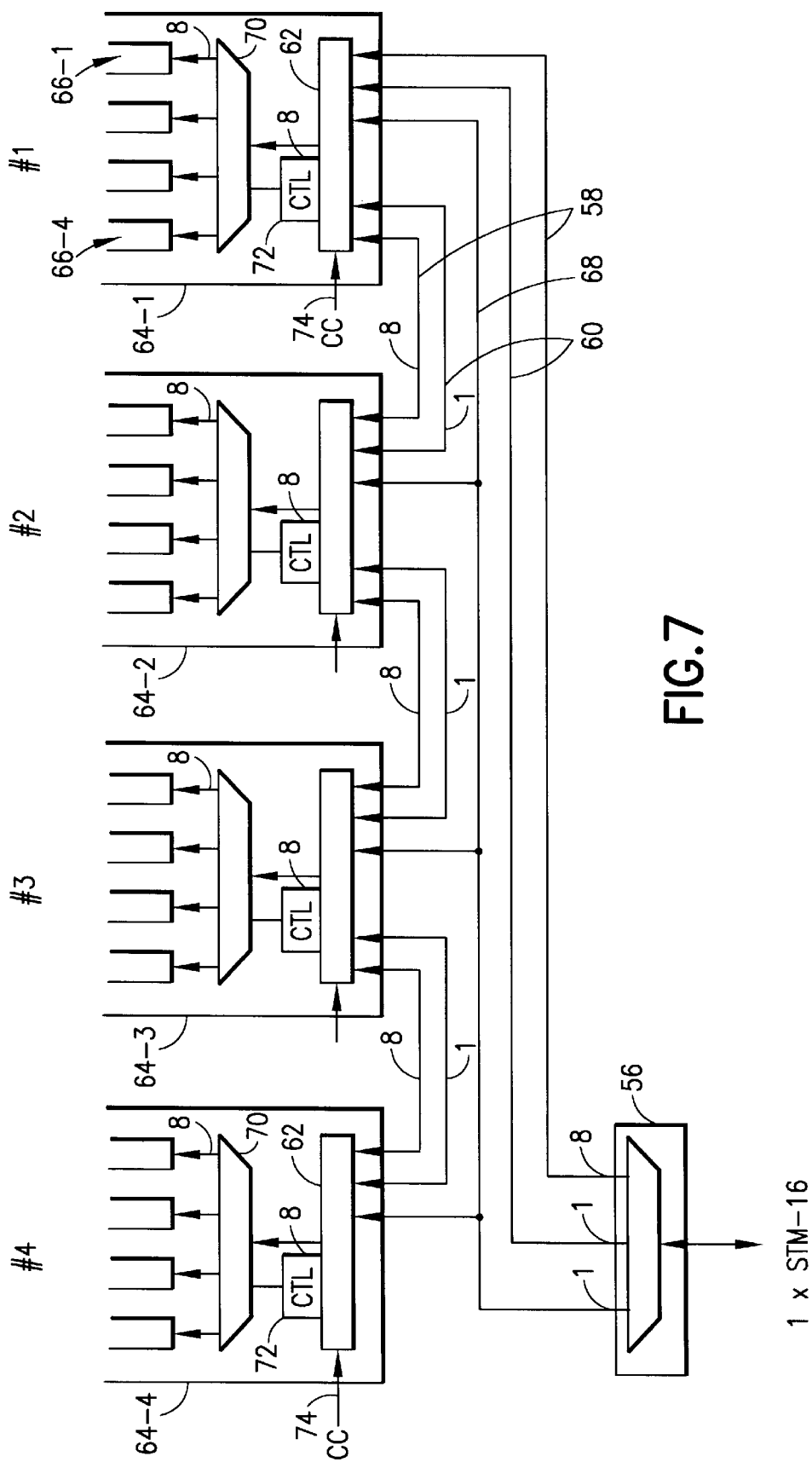
FIG. 7 is a block diagram of a configurable demultiplexer arrangement (Line Interface Macro) for a group of multi-module chips, according to the invention.

A block diagram of a demultiplexer arrangement for a group of four STM-4 chips, which can handle an STM-16 signal, is shown in FIG. 7. An external receiver stage 56 operating at 2.4 Gbit/s (commercially available circuitry, e.g. a VS8021/8022 chip set, available from VITESSE Semiconductor Corp, Camarillo, Calif. 93012, USA) provides clock recovery as well as byte and frame alignment. The four STM-4 chips are interconnected by 9-bit signal paths (8-bit data lines 58 and one start-of-frame signal line 60), such that a cascaded pipeline is achieved. The data bytes of an SDH frame which are output by the 2.4 Gbit/s receiver stage 56 are fed into pipeline register/gating circuitry 62 of the first STM-4 chip (64-1) on the right of FIG. 7 (chip #1) and are clocked through all the other chips from right to left under control of the byte clock signal on line 68. Each STM-4 chip (64-i) as well as each of the four modules (66-i) within each chip can access through demultiplexer/gating circuitry 70 exactly those data it must process according to its position, e.g., module #1 in chip #1 processes first A1 byte of an STM-16 frame, module #2 in chip #1 processes the second A1 byte of an STM-16 frame and so forth. Configuration control information CC is written into a table of control means CTL 72 in each chip via interface 74.

This pipelining and fetching mechanism operates as a demultiplexer and is described in more detail by the following list, which shows the first 46 bytes of an STM-16 frame as they are output by the 2.4 Gbit/s receiver stage and fetched by the four chips and their respective modules. The bytes are numbered according to the nomenclature as given by ITU standard recommendation G.708 (see above).

| Module | #1 | #2 | #3 | #4 |
|---|---|---|---|---|
| STM-4 chip #1 | | | | |
| fetches and forwards byte | 1, 1, 1 | 1, 1, 2 | 1, 1, 3 | 1, 1, 4 |
| | 1, 2, 1 | 1, 2, 2 | 1, 2, 3 | 1, 2, 4 |
| | 1, 3, 1 | 1, 3, 2 | 1, 3, 3 | 1, 3, 4 |
| STM-4 chip #2 | | | | |
| fetches and forwards byte | 1, 1, 5 | 1, 1, 6 | 1, 1, 7 | 1, 1, 8 |
| | 1, 2, 5 | 1, 2, 6 | 1, 2, 7 | 1, 2, 8 |
| | 1, 3, 5 | 1, 3, 6 | 1, 3, 7 | 1, 3, 8 |

-continued

| Module | #1 | #2 | #3 | #4 |
|---|---|---|---|---|
| STM-4 chip #3 | | | | |
| fetches and forwards byte | 1, 1, 9 | 1, 1, 10 | 1, 1, 11 | 1, 1, 12 |
| | 1, 2, 9 | 1, 2, 10 | 1, 2, 11 | 1, 2, 12 |
| | 1, 3, 9 | 1, 3, 10 | 1, 3, 11 | 1, 3, 12 |
| STM-4 chip #4 | | | | |
| fetches and forwards byte | 1, 1, 13 | 1, 1, 14 | 1, 1, 15 | 1, 1,16 |
| | 1, 2, 13 | 1, 2, 14 | 1, 2, 15 | 1, 2,16 |
| | 1, 3, 13 | 1, 3, 14 | 1, 3, 15 | etc. |

Thus, FIG. 7 shows the principle structure of the Line Interface Macro (LIM) supporting an STM-16 signal. It contains the pipeline stage 62 with additional logic and the section 70 operating as demultiplexer. As already shown in above table, each pipeline stage 62 fetches four successive bytes (quadruple) according to the position of the STM-4 chip, forwards these bytes to the demultiplexer 70 and lets pass by the next twelve bytes. The first module (SDH module #1) receives the first byte of a received quadruple, SDH module #2 receives the second byte and so on.

The byte-to-module association given in this table is a default one. Any arbitrary association can be selected by entering respective configuration control data (CC) into a table of control means CTL 72 via interface 74.

Figure 8:
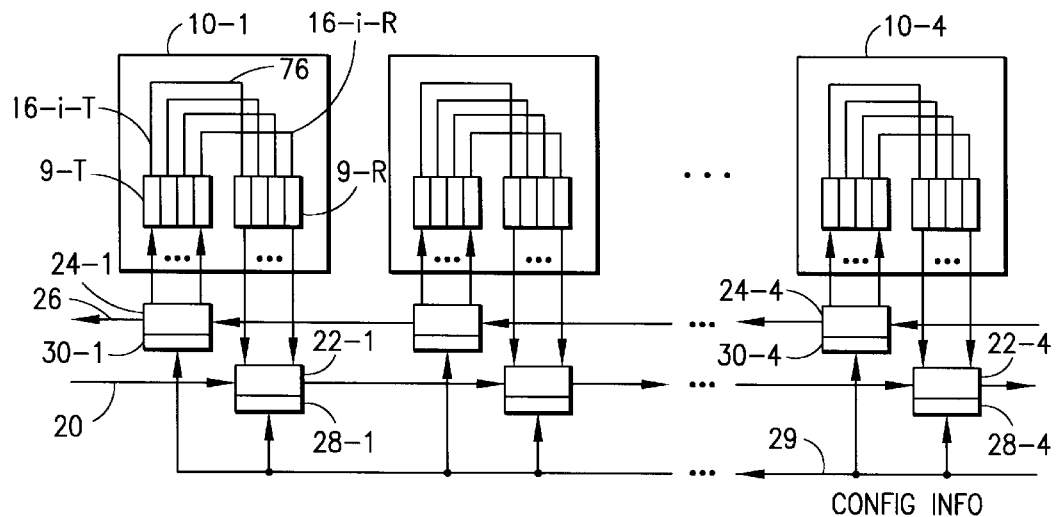
FIG. 8 shows a digital cross-connect interconnection scheme for the modules on multi-module chips with a configurable multiplexer/demultiplexer stage.
Figure 9:
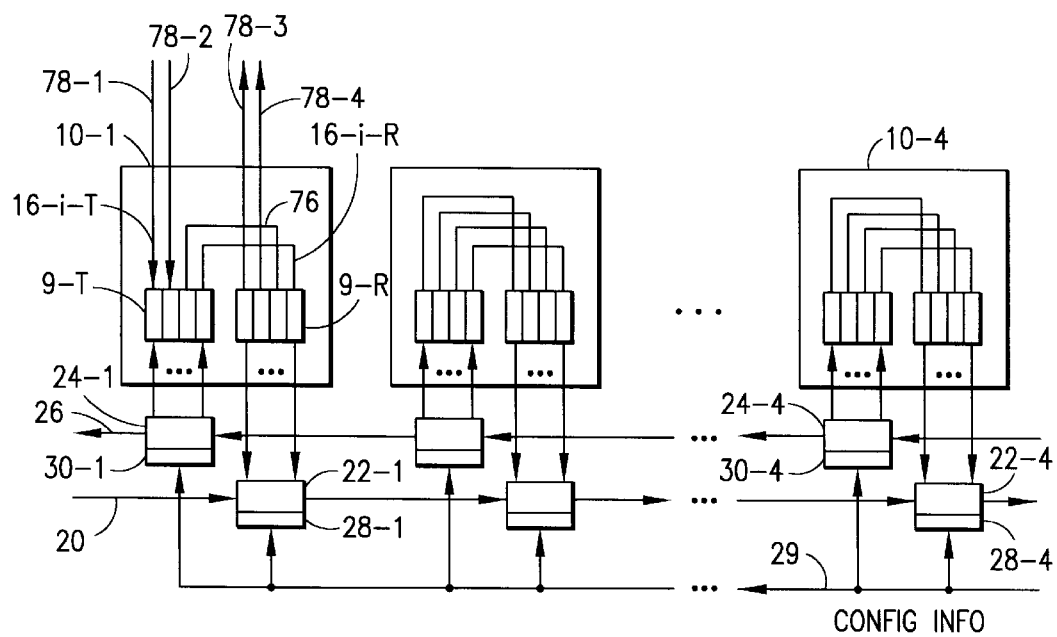
FIG. 9 shows a partial digital crossconnect and partial add-drop interconnection scheme for modules on multi-module chips with a configurable random-access multiplexer/demultiplexer.

With reference to FIGS. 8 and 9, there will be shown in the following how the internal interfaces (16-i) of the basic modules in all four chips can be interconnected to achieve the crossconnect and add/drop functionality in connection with the configurable mux/demux arrangement of the invention which was described above.

As shown in FIG. 8, the four receive module (9-R) interior interfaces (16-i-R) are connected with the four transmit module (9-T) interior interfaces (16-i-T) in a systematic scheme by connecting lines 76, in the same way in all four chips. This results in a 1:1 transit. Thus, no crossconnect switching is required within in the chips (and the chip design is simplified). All the actual switching, or rearrangement of tributary signals within frames is achieved by the particular configurable multiplexing/demultiplexing arrangement as described.

FIG. 9 shows an interconnection scheme for the case where add/drop multiplexing is required, i.e. insertion of signals from local ports 78-i into STM-16 frames, or extraction of tributary signals from STM-16 frames for delivery to local ports. In this case, two of the receive module 9-R interior interfaces 16-i-R and two of the transmit module 9-T interior interfaces 16-i-T of the first chip 10-1 only are connected to respective local ports 78-1 through 78-4, whereas the other interconnections among interior interfaces are the same as shown in FIG. 8. Despite the fixed connection to local ports, tributary signals from any selected portion of the STM-16 frames can be dropped to the local ports, or can be inserted into any portion of the frames, due to the respective configuration possibility of the particular multiplexer/demultiplexer arrangement of the invention. Instead of two local input and output ports, any other number can of course be served, by providing the appropriate number of interconnections between interior module interfaces and local ports.

It should be noted that the operations of the configurable, random-access multiplexing and demultiplexing arrangement are described above for the stationary status, i.e. when no changes in the configuration occur.

If the association between modules and tributary signals is to be changed, new configuration data have to be loaded into the multi-plexer/demultiplexer control means, and only after some transition time (in which test signals have to be sent and monitored) the new stationary status (as described in above examples) will be reached. Signal handling during transition periods is governed by the existing standard protocols.

What is claimed is:

1. Interconnection apparatus for high-speed signals organized in synchronous frames, said high-speed signals including a plurality of low-speed data signals as tributary signals, said interconnection apparatus comprising:

a plurality of parallel processing modules (9-T, 9-R; 66-1, . . . 66-4) with first interfaces (5,6; 12-1 . . . 12-4; 12-i-T, 12-i-R) and second interfaces (7,8; 16-1 . . . 16-4; 16-i-T, 16-i-R), each of said plurality of parallel processing modules provided for manipulating portions of said tributary signals in parallel with the manipulating of other portions of said tributary signals by other of said plurality of parallel processing modules, and configurable multiplexing/demultiplexing means (14, 34, 38, 40, 42) enabling each said plurality of parallel processing module (66-i) to access any portion of an arbitrarily preselected tributary signal in said high-speed signals and providing said accessed portion to at least one of said plurality of parallel processing modules without disassembling and demultiplexing said signals;

wherein the configurable multiplexing/demultiplexing means (14; 34, 38, 40, 42) includes a pipeline arrangement (20, 22-1 . . . 22-4; 24-1 . . . 24-4, 26; 32, 36; 58, 62, 70) for sequentially transferring a high-speed signal along the plurality of parallel processing modules (66-i) and for selectively transferring tributary signals into and out of the first interfaces (12-i) of said plurality of parallel processing modules, according to configuration information (29; 50; 74) provided to control means (28-1 . . . 28-4; 30-1 . . . 30-4; 46; 72) for said multiplexing/demultiplexing means.

2. The interconnection apparatus according to claim 1, wherein:

the parallel processing modules (9-T, 9-R; 66-1) are arranged in module groups on separate chips (10-i; 64-i), and the configurable multiplexing/demultiplexing means (14) are arranged in a plurality of cascaded stages, each stage (32 . . . 42; 62, 70) being associated to one module group on a chip.

3. The interconnection apparatus according to claim 2, wherein each group of processing modules (66-i) and an associated stage (62, 70) of the cascaded configurable multiplexing/demultiplexing means are integrated on the same chip (64-i).

4. The interconnection apparatus according to claim 2, wherein the configurable multiplexing/demultiplexing means (14) are arranged in at least two levels (34/40, 38/42; 62, 70) which can operate with different timing (G1; G2).

5. Interconnection apparatus according to claim 1, wherein said multiplexing/demultiplexing means comprise:

gating means (34, 38, 40, 42) for selectively gating either high-speed signals or tributary signals out of and into said synchronous frames, in response to gating control signals (G1, G2), and control signal generating means (44) for generating said gating control signals (G1, G2) in response to stored configuration control data (46, 50) and timing signals (48, 52, 54).

6. Interconnection apparatus according to claim 1, wherein said multiplexing/demultiplexing means comprise for each of said plurality of parallel processing modules:

input and output retiming buffers (32, 36) for incoming and outgoing high-speed signals;

first multiplexing gating circuitry (34, 40) for transferring either high-speed signals from an input retiming buffer (32) or tributary signals from local lines (12-i-T) to an output retiming buffer;

second multiplexing gating circuitry for selectively gating tributary signals from local lines (12-i-t) to said first multiplexing gating circuitry; and gating control signal generation means (44) for generating gating control signals (G1, G2) for said first and second multiplexing gating circuitry in response to previously stored configuration control data (46, 50) and timing signals (48, 52, 54) derived from signals in said synchronous frames.

7. Interconnection apparatus according to claim 1, wherein said plurality of parallel processing modules each consist of a transmit portion (9-T) and a receive portion (9-R), and wherein said configurable multiplexing/demultiplexing means also include separate portions for transmit operations (24-i) and for receive operations (20-i).

8. Interconnection apparatus for high-speed signals organized in synchronous frames, said high-speed signals including a plurality of low-speed data signals as tributary signals, said interconnection apparatus comprising:

a plurality of parallel processing modules (9-T, 9-R; 66-1, . . . 66-4) with first interfaces (5, 6; 12-1 . . . 12-4; 12-i-T, 12-i-R) and second interfaces (7,8; 16-1 . . . 16-4; 16-i-T, 16-i-R), each of said plurality of parallel processing modules provided for manipulating portions of said tributary signals in parallel with the manipulating of other portions of said tributary signals by other of said plurality of parallel processing modules, and configurable multiplexing/demultiplexing means (14, 34, 38, 40, 42) enabling each said plurality of parallel processing module (66-i) to access any portion of an arbitrarily preselected tributary signal in said high-speed signals and providing said accessed portion to at least one of said plurality of parallel processing modules without disassembling and demultiplexing said signals;

wherein predetermined fixed connections (76) are provided among the second interfaces (16-i) of the parallel processing modules (9-T, 9-R; 66-i), whereby, based on this fixed interconnection scheme and the operation of the configurable multiplexing/demultiplexing means (14; 24-i, 28-i; 34, 38, 40, 42), any tributary signals can be arbitrarily rearranged between synchronous frames arriving on incoming lines (20) and synchronous frames departing on outgoing lines (26).

9. Interconnection apparatus for high-speed signals organized in synchronous frames, said high-speed signals including a plurality of low-speed data signals as tributary signals, said interconnection apparatus comprising:

a plurality of parallel processing modules (9-T, 9-R; 66-1, . . . 66-4) with first interfaces (5,6; 12-1 . . . 12-4; 12-i-T, 12-i-R) and second interfaces (7,8; 16-1 . . . 16-4; 16-i-T, 16-i-R), each of said plurality of parallel processing modules provided for manipulating portions of said tributary signals in parallel with the manipulating of other portions of said tributary signals by other of said plurality of parallel processing modules, and configurable multiplexing/demultiplexing means (14, 34, 38, 40, 42) enabling each said plurality of processing module (66-i) to access any portion of an arbitrarily preselected tributary signal in said high-speed signals and providing said accessed portion to at least one of said plurality of parallel processing modules without disassembling and demultiplexing said signals;

wherein predetermined fixed connections (76) are provided among the second interfaces (16-i) of the parallel processing modules (9-T, 9-R; 66-i) and also between the second interfaces of said modules and local ports (78-1 . . . 78-4), whereby, based on this fixed interconnection scheme and the operation of said configurable multiplexing/demultiplexing means (14; 34, 38, 40, 42), tributary signals can be arbitrarily rearranged between synchronous frames arriving on incoming lines (20) and synchronous frames departing on outgoing lines (26) and can be arbitrarily exchanged between local ports and arriving or departing synchronous frames.

10. A method for providing interconnection processing of high speed signals organized in synchronous frames, said high speed signals including a plurality of low-speed data signals as tributary signals, comprising the steps of:

selectively accessing portions of said high speed signals at configurable multiplexing/demultiplexing means without demultiplexing or disassembling said signals;

providing the selectively accessed portions of said high speed signals for parallel processing at a plurality of parallel processing modules having first interfaces and second interfaces; and providing a pipeline arrangement at said multiplexing/demultiplexing means for sequentially transferring a high-speed signal along the plurality of parallel processing modules and for selectively transferring tributary signals into and out of the first interfaces of said plurality of parallel processing modules, according to configuration information provided to control means for said multiplexing/demultiplexing means.

11. The method of claim 10 further comprising the step of processing said selectively accessed portions of said high speed signals.

12. The method of claim 11 wherein said processing comprises cross connecting said signals.

13. The method of claim 11 wherein said processing comprises performing add/drop operations on said signals.

14. The method of claim 10 wherein said selectively accessing portions of said signals is conducted based on preset configuration information.

15. A program storage device readable by machine tangibly embodying a program of instructions executable by the machine to perform method steps for providing interconnection processing of high speed signals organized in synchronous frames, said high speed signals including a plurality of low-speed data signals as tributary signals, said method comprising the steps of:

selectively accessing portions of said high speed signals at configurable multiplexing/demultiplexing means without demultiplexing or disassembling said signals;

providing the selectively accessed portions of said high speed signals for parallel processing at a plurality of parallel processing modules having first interfaces and second interfaces; and providing a pipeline arrangement at said multiplexing/demultiplexing means for sequentially transferring a high-speed signal along the plurality of parallel processing modules and for selectively transferring tributary signals into and out of the first interfaces of said plurality of parallel processing modules, according to configuration information provided to control means for said multiplexing/demultiplexing means.

16. A method for providing interconnection processing of high speed signals, said high speed signals including a plurality of low-speed data signals as tributary signals and being organized in synchronous frames, comprising the steps of:

selectively accessing portions of said high speed signals at configurable multiplexing/demultiplexing means without demultiplexing or disassembling said signals;

providing the selectively accessed portions of said high speed signals for parallel processing at a plurality of parallel processing modules having first interfaces and second interfaces; and providing predetermined fixed connections among the second interfaces of the plurality of parallel processing modules, whereby, based on this fixed interconnection scheme and the operation of the configurable multiplexing/demultiplexing means, any tributary signals can be arbitrarily rearranged between synchronous frames arriving on incoming lines and synchronous frames departing on outgoing lines.

17. A method for providing interconnection processing of high speed signals, said high speed signals including a plurality of low-speed data signals as tributary signals and being organized in synchronous frames, comprising the steps of:

selectively accessing portions of said high speed signals at configurable multiplexing/demultiplexing means without demultiplexing or disassembling said signals;

providing the selectively accessed portions of said high speed signals for parallel processing at a plurality of parallel processing modules having first interfaces and second interfaces; and providing predetermined fixed connections among the second interfaces of the plurality of parallel processing modules and also between the second interfaces of the plurality of parallel processing modules and local ports, whereby, based on this fixed interconnection scheme and the operation of the configurable multiplexing/demultiplexing means, tributary signals can be arbitrarily rearranged between synchronous frames arriving on incoming lines and synchronous frames departing on outgoing lines and can be arbitrarily exchanged between local ports and arriving or departing synchronous frames.

18. A program storage device readable by machine tangibly embodying a program of instructions executable by the machine to perform method steps for providing interconnection processing of high speed signals, said high speed signals including a plurality of low-speed data signals as tributary signals and being organized in synchronous frames, said method comprising the steps of:

selectively accessing portions of said high speed signals at configurable multiplexing/demultiplexing means without demultiplexing or disassembling said signals;

providing the selectively accessed portions of said high speed signals for parallel processing at a plurality of parallel processing modules having first interfaces and second interfaces; and providing predetermined fixed connections among the second interfaces of the plurality of parallel processing modules, whereby, based on this fixed interconnection scheme and the operation of the configurable multiplexing/demultiplexing means, any tributary signals can be arbitrarily rearranged between synchronous frames arriving on incoming lines and synchronous frames departing on outgoing lines.

19. A program storage device readable by machine tangibly embodying a program of instructions executable by the machine to perform method steps for providing interconnection processing of high speed signals, said high speed signals including a plurality of low-speed data signals as tributary signals and being organized in synchronous frames, comprising the steps of:

selectively accessing portions of said high speed signals at configurable multiplexing/demultiplexing means without demultiplexing or disassembling said signals;

providing the selectively accessed portions of said high speed signals for parallel processing at a plurality of parallel processing modules having first interfaces and second interfaces; and providing predetermined fixed connections among the second interfaces of the plurality of parallel processing modules and also between the second interfaces of the plurality of parallel processing modules and local ports, whereby, based on this fixed interconnection scheme and the operation of the configurable multiplexing/demultiplexing means, tributary signals can be arbitrarily rearranged between synchronous frames arriving on incoming lines and synchronous frames departing on outgoing lines and can be arbitrarily exchanged between local ports and arriving or departing synchronous frames.

\* \* \* \* \*